Sept. 30, 1969   G. HUTCHINSON   3,469,509

METAL DECKING

Filed Nov. 15, 1966

INVENTOR.
George Hutchinson

BY
his Attorneys

United States Patent Office 3,469,509
Patented Sept. 30, 1969

3,469,509
METAL DECKING
George Hutchinson, Canonsburg, Pa., assignor to The Howard Meinhardt Company, Pittsburgh, Pa.
Filed Nov. 15, 1966, Ser. No. 594,543
Int. Cl. E01c 5/16; E04f 11/16; E04c 1/10
U.S. Cl. 94—13                                    7 Claims

ABSTRACT OF THE DISCLOSURE

A metal decking comprised of a plurality of angular units having integral interlocking joints. The joints between angular units transmit substantially all transverse loading and torque loading without the aid of separate fastening means. The angular units may be placed in paralleled array and supported by I-beams for bridge construction, and the angular units may be placed in staggered array and supported by interlocking them with channel members which themselves are fastened together by integral interlocking joints without the aid of separate fastening means for airstrip construction.

Figure 1:
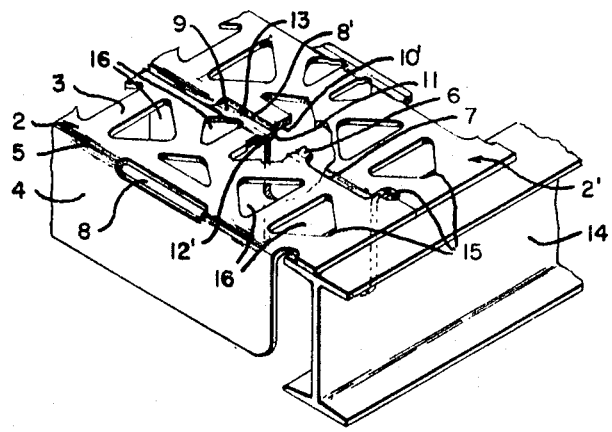

This invention relates to metal decking for bearing surfaces and bases for bearing surfaces which are subjected to large point loads or large loads distributed over a small area, such as surfaces for bridges or aircraft landing strips. It is particularly useful in allowing efficient and versatile fabrication of a metal decking having increased rigidity and carrying capacity for a structure of a given gross weight and given dimensions.

The use of metal decking to fabricate bearing surfaces and bases for bearing surfaces which may be subjected to large point loads or large loads distributed over a small area is broadly old and well known. It provides the constructor with a rigid and durable bearing surface, or a rigid and durable base for an asphalt or concrete bearing surface, over which can be passed heavy motor vehicles without damage to the surface. Such metal decking heretofore had to be fabricated for the particular structure in large heavy sheets with integral truss parts or welded truss pieces or both, or they had to be field formed and assembled by extensive precision welding. In any case, the assembling welds had to be capable of withstanding very large stresses, and heavy handling equipment was necessary to assemble the metal decking. Such procedures were in general clumsy and laborious, and were also impractical for such purposes as the assembling of a tactical military landing field for aircraft.

The use of angular units to construct metal decking is broadly old and well known. Such units provided inherent advantages over other types of construction for metal decking: they can be easily fabricated en masse by simply stamping them from large sheets and thereafter bending them in one continuous operation, they can be easily shipped in compact bundles, and they can be easily and versatilely assembled by placing them side to side in long runs. But angular unit construction has not heretofore been practical for metal decking which was subjected to large point loads or large loads distributed over a small area. It is a physical fact that a large point load or large load distributed over a small area on the surface of a metal sheet causes deformtion and deflection of the sheet and proportionally large stresses in the sheet. Thus when an angular unit in an assembled decking was subjected to a large point load or large load distributed over a small area near its center, the angular unit deflected and deformed with the truss part thereof remaining a substantially rigid fulcrum. If the joint between the angular unit and a like adjacent angular unit was placed directly over the truss part of the angular unit or the truss part of the like adjacent angular unit, the fastening means had to be able to withstand large torsional stresses. On the other hand, if the joint between the anglar units was not directly over one of the truss parts, the fastening means had to be able to withstand large transverse stresses and be so positioned that the raw edge of the angular unit would not deflect upward, exposing an edge above the load bearing surface of the assembled decking and in turn impairing the use of the load bearing surface as a whole. In any case, these fastening means had to be proportionally large and carefully assembled. Weld joints were the best fastening means, but they were impractical because of the precision and copious field welding which was necessary.

The present invention overcomes these disadvantages and makes angular unit construction commercially feasible in the building of metal decking to be subjected to large point loads and large loads distributed over a small area.

I provide metal decking for bridges, airstrips and the like comprising a plurality of interlocking angular units, each angular unit having substantially the same shape and dimensions. Each angular unit has a load bearing part and a truss part extending lengthwise of said load bearing part for substantially the length of said load bearing part for forming a corner between them to form a substantially L-shaped member, the two parts being preferably at substantially right angles to each other. Each angular unit also has at least one tongue portion on lengthwise side portions of the load bearing part which is offset from the load bearing part which is offset from the load bearing part. Further, each angular unit has a tongue opening in the truss part near the corner formed with the load bearing part which is aligned with each said tongue portion. Preferably each angular unit has more than one tongue portion and corresponding tongue opening positioned away from the center of it, thereby giving it greater rigidity at the center after assembly. And the tongue portions have substantial portions of their surface areas essentially parallel to or concentric with the contour of the load bearing surface of the assembled metal decking.

When the angular units are assembled, the tongue portion or portions fit into the tongue opening or openings of an adjacent angular unit, and thereby interlock and align the angular units with each other. Tongue portion or portions of each angular unit engage the edge of the corresponding tongue opening or openings, and in turn the load bearing part is supported by the truss part of an adjacent angular unit. Further, each tongue has a surface area of it in contact with a surface area of the load bearing part of an adjacent angular unit, said surface area being capable of withstanding a substantial portion of a torque producing load on the load bearing part of each angular unit and thereby stopping upward deflection of the tongue portion or portions above the load bearing surface of the assembled decking. Said tongue portions can be of any suitable size depending upon the type of metal used to make the angular unit and the type and degree of loading to which the angular units are subjected.

By this arrangement, metal decking can be constructed which has a minimum of stress placed on the fastening means between the angular units and which, under some conditions, can be assembled without any fastening means. Preferably, however, weld joints are used as the fastening means, the angular units being held in place by welds along the tongue portion or portions of each angular unit. All the welding can be easily and efficiently done from the load bearing surface without scaffolding or special equipment, and all parts of the installation may be easily and efficiently inspected from the load bearing surface. Further, it is preferred that the weld joints be made with a malleable metal so that the joints will yield under any torsional stresses caused by the deflection of the load bearing parts of the angular units and associated opposite deflection of said tongue portions.

Further, this type of metal decking offers more carrying capacity and greater rigidity for a structure of a given gross weight and given dimensions than previous decking because of the interlocking features and truss features of the angular units. Moreover, because of the relatively small dimensions and weight of each angular unit and the interlocking features of them, they can be permanently positioned to almost any contour with a minimum of labor and expense and be immediately ready for use. In addition, this type of angular unit construction maintains the inherent advantages above stated which were previously associated with angular unit construction.

The interlocking angular units can be supported by any suitable means. But when the decking is used in bridge construction, it is preferred that standard rolled I-beams be used as supports. Such I-beams can be laid end to end in essentially parallel strings on the framework of the bridge and welded together and thereto; the angular units can then be positioned astride the strings of I-beams and interlocked and welded together and thereto.

When the decking is used in the construction of aircraft landing strips, it is preferred that interlocking channel members, preferably of an inverted U-shape, be used to support the angular units. Each channel member preferably has offset tab portions on end portions of it and corresponding tab receivers in the opposite end portions of it wherein the tab portions of an adjacent channel member can be interlocked. By this interlocking assembly the joints between channel members can be made to remain substantially rigid when loads are placed upon the load bearing parts of the assembled decking, even though no fastening means are used to hold the channel members in place. In turn, they allow the assembled channel members to have a bridging effect over soft spots in the ground and not be jolted apart by an impact of a dead load.

These channel members can be assembled end to end in long, essentially parallel strings and welded together, and the angular units then positioned and interlocked astride the strings of channel members and welded together and thereto. However, it is preferred that each angular unit be provided with at least one ear portion on lengthwise edge portions of the truss part thereof and each channel member be provided with corresponding ear openings aligned to receive said ear portions. Thus, when a load is applied to the load bearing parts of the angular units the torque producing portion of said load is withstood at least in part by the reaction force of the edges of the ear openings in the channel members against the ear portions of the truss parts of the angular units. In addition, the relative positions between the assembled strings of channel members can be maintained. As a further preference, the positioning of the ear portions of the angular units and the spacing between the assembled strings of channel members are coordinated so that the angular units can be assembled in staggered array astride the assembled strings of channel members. By this preferred assembly it is possible to construct metal decking capable of withstanding large loads distributed over a small area without a single fastening means. Further, should it be decided to add permanence to the decking by welding the angular units in place, all the welding can be accomplished from the load bearing surfaces of the assemblage without special equipment.

In another preferred embodiment, each angular unit has a pattern of irregular openings in the load bearing part thereof. Said pattern of irregular openings provides traction for vehicles passing over the assembled decking when the decking is used openly as a bearing surface. It also provides a means of ingress for asphalt or concrete to make an integrated rigid bed when the decking is used as a base for a bearing surface. Moreover, said openings reduce the weight of the angular units without sacrificing rigidity, thereby allowing angular units of larger dimensions to be assembled with a minimum of labor and expense and reducing the gross weight of an assembled decking of given dimensions and given carrying capacity.

In a further preferred embodiment, each tongue portion of each angular unit is enlarged so that a greater surface area thereof can be placed in contact with a surface area of the load bearing part of an adjacent angular unit and also extends through to align end portions of each tongue portion with one of the irregular openings in the load bearing part of angular unit. And each enlarged tongue portion has a substantial portion of its surface area essentially parallel to or concentric with the contour of the bearing surface of the assembled metal decking. The end portions of said tongue portions can then be welded to the load bearing part of the adjacent angular unit without impairing the bearing surface of the assembled decking from the load bearing surface without special equipment. By this assembly, the tongue portions cannot freely deflect and translational stresses are produced in the weld joint on the end portions of said tongue portions. The stresses produced in a particular angular unit are, however, transmitted to an adjacent angular unit more readily and can be transmitted to angular units beyond the adjacent angular unit. In short, this embodiment provides a more integrated, rigid metal decking which is capable of withstanding very large dynamic loads distributed over a small area, such as those encountered by decking used for landing strips for medium and heavy aircraft.

Other details, objects and advantages of my invention will become apparent as the following description of the presently preferred embodiment thereof proceeds.

Figure 2:
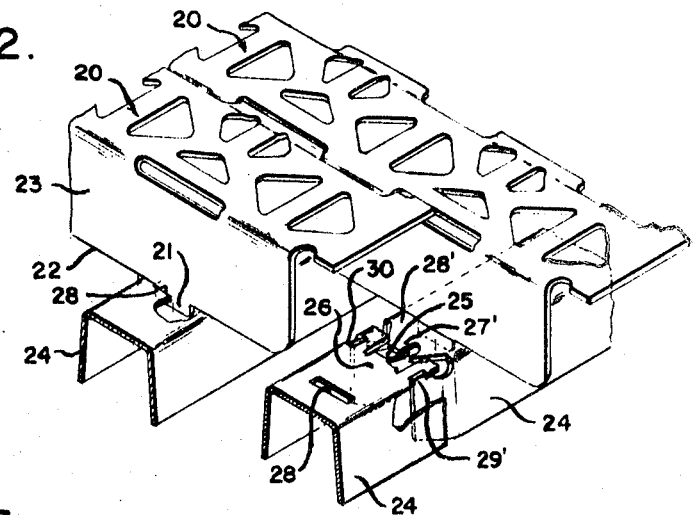
Figure 3:
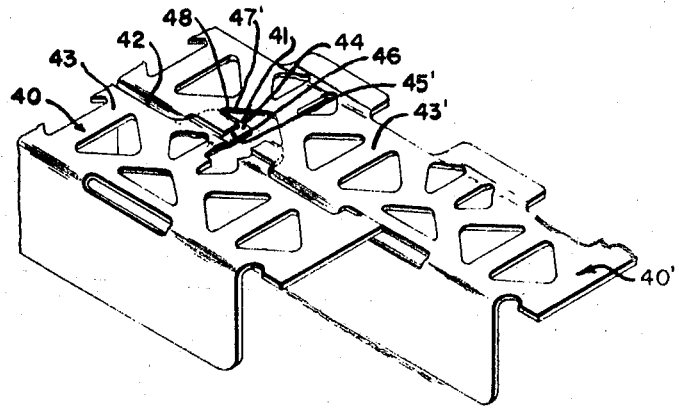

In the accompanying drawings, I illustrate presently preferred embodiments of my invention in which:

FIGURE 1 is a perspective view with portions broken away of a metal decking composed of interlocking angular units supported by standard rolled I-beams;

FIGURE 2 is a perspective view with portions broken away of a metal decking composed of interlocking angular units in staggered array supported by and interlocked with interlocking U-shaped channel members; and FIGURE 3 is a perspective view with portions broken away of a metal decking composed of interlocking angular units with enlarged tongue portions, having end portions thereof welded to the load bearing part of an adjacent angular unit.

Referring specifically to the drawings, a metal decking is comprised of a plurality of angular units 2 of a substantially inverted L-shape. Each angular unit 2 has a load bearing part 3 and a truss part 4 extending lengthwise of said load bearing part 3 for substantially the length of said load bearing part 3 for forming a corner 5 between them. Each angular unit 2 also has at least one tongue portion 6 on lengthwise side portions 7 of the load bearing part 3 which is offset from the load bearing part 3. Further, each angular unit 2 has corresponding tongue opening 8 in the truss part 4 near the corner 5 aligned with the tongue portion 6. When assembled, the tongue portion 6 of angular unit 2 fits into the tongue opening 8′ of a like adjacent angular unit 2′ and has surface area 9 in contact with surface area 10′ of the loading bearing part of said adjacent angular unit 2′, and has surface area 11 in contact with surface area 12′ of the truss part of said adjacent angular unit 2′. The angular unit 2 is suitably welded to said adjacent angular unit 2′ at 13.

In a preferred embodiment for use in the construction of bridges, the assembled decking of angular units 2 is supported by essentially parallel strings of standard rolled I-beams 14 which are welded end to end. The angular units 2 are laid astride the essentially parallel strings of I-beams 14 and welded to the I-beams 14 at 15.

Preferably, each angular unit 2 has a pattern of irregular openings 16 in the load bearing part 3. Said pattern of irregular openings 16 provides traction for vehicles passing over the assembled decking and reduces the gross weight of the decking without sacrificing rigidity.

In another preferred embodiment for use in the construction of aircraft landing strips, the angular units 20 are constructed the same as hereinabove described, with the addition of at least one ear portion 21 on lengthwise edge portions 22 of the truss part 23 thereof. The assembled angular units 20 are supported by a plurality of inverted U-shaped channels 24. Each channel member 24 has offset tab portion 25 on end portions 26 and hook openings 30 in end portions 26. Each said adjacent channel member 24' has corresponding tab receiver 27' and offset hook portions 29' in the opposite end portions 28'. When a channel member 24 and like adjacent channel member 24' is assembled, the tab portion 25 and hook openings 30 of channel member 24 interlock with tab receiver 27' and hook portions 29'. Each channel member 24 also has ear openings 28 which are aligned to receive the ear portions 21 of the angular units 20. As a further preference, the positioning of the ear portions 21 of the angular units 20, and the spacing between the assembled strings of channel members 24 are coordinated so that the angular units 20 can be assembled in staggered array astride the assembled strings of channel members 24 as shown. By this embodiment it is possible to construct metal decking capable of withstanding large loads distributed over a small area without a single fastening means.

In a further preferred embodiment for use in the construction of landing strips for medium and heavy aircraft, the angular units 40 are constructed the same as hereinabove described in the last preferred embodiment, except the tongue portions 41 on the lengthwise side portions 42 of the load bearing part 43 are enlarged so that a greater surface area 44 thereof is in contact with a surface area 45' of the load bearing part 43' of an adjacent angular unit 40' and extends through to align end portions 46 thereof with certain openings 47' in the load bearing part 43' of an adjacent angular unit 40'. Each tongue portion 41 has end portion 46 attached by a fillet weld at 48 to the load bearing part 43' of an adjacent angular unit 40'. By this assembly, the load bearing part 43' of the adjacent angular unit 40' strengthens said tongue portions 41 and vice versa, and said tongue portions 41 cannot freely deflect. This embodiment provides a greatly reinforced decking which can withstand very large dynamic loads distributed over small areas.

While I have shown and described certain present preferred embodiments and uses of the invention, it is to be distinctly understood that the invention is not limited thereto but may be otherwise variously embodied.

I claim:

1. Metal decking for bridges, airstrips and the like comprising: a plurality of interlocking substantially L-shaped angular units, each angular unit having a load bearing part and truss part extending lengthwise of said load bearing part for substantially the length of said load bearing part, each angular unit having at least one offset tongue portion on lengthwise side portions of the load bearing part and having at least one corresponding tongue opening in the truss part near the load bearing part aligned with a said tongue portion whereby each said tongue portion will fit into one of the tongue openings in a like shaped adjacent angular unit, each said tongue portion having a surface area in contact with a surface area of the load bearing part of said adjacent angular unit capable of withstanding a substantial portion of a torque producing load on the load bearing part of said angular unit.

2. Metal decking for bridges, airstrips and the like comprising: a plurality of interlocking angular units, each angular unit having a load bearing part and a truss part, each angular unit having at least one offset tongue portion on lengthwise side portions of the load bearing part and having at least one corresponding tongue opening in the truss part near the load bearing part aligned with a said tongue portion whereby each said tongue portion will fit into one of the tongue openings in a like shaped adjacent angular unit, each said tongue portion having a surface area in contact with a surface area of the load bearing part of said adjacent angular unit capable of withstanding a substantial portion of a torque producing load on the load bearing part of said angular unit; said plurality of interlocking angular units being supported by inverted substantially U-shaped channel members by contacting surface areas of the load bearing parts of said angular units, each said channel member having offset tab portions on end portions of it and corresponding tab receivers in opposite end portions of it aligned with said tab portions whereby each tab portions engages on the tab receivers in a line shaped adjacent channel member for forming a substantially rigid joint.

3. Metal decking for bridges, airstrips and the like comprising: a plurality of interlocking angular units, each angular unit having a load bearing part and a truss part, each angular unit having at least one offset tongue portion on lengthwise side portions of the load bearing part and having at least one corresponding tongue opening in the truss part near the load bearing part aligned with a said tongue portion whereby each said tongue portion will fit into one of the tongue openings in a like shaped adjacent angular unit, each said tongue portion having a surface area in contact with a surface area of the load bearing part of said adjacent angular unit capable of withstanding a substantial portion of a torque producing load on the load bearing part of said angular unit, each angular unit having at least one ear portion on lengthwise edge portions of the truss part; said plurality of angular units being supported by inverted substantially U-shaped channel members by fitting the ear portions of the angular units into openings in the channel members aligned to receive them whereby the ear portions of the angular units are capable of withstanding substantial portion of a torque producing load on the load bearing part of said angular unit, each said channel member having offset tab portions on end portions of it and corresponding tab receivers in opposite end portions of the aligned with said tab portions whereby each tab portion engages one of the tab receivers in a line shaped adjacent channel member for forming a substantially rigid joint.

4. Metal decking as claimed in claim 1 where said load bearing part of each said angular unit has openings therein capable of improving the traction for vehicles passing over it.

5. Metal decking as claimed in claim 3 where the ear portions on end portions of truss part of each said angular unit are so positioned that the spacing between them can be coordinated with the spacing between assembled strings of channel members whereby said angular units can be assembled in a staggered array.

6. Metal decking as claimed in claim 1 wherein each tongue portion has a substantial part a part of its surface area substantially conforming to the contour of surface portions of the load bearing parts.

7. Metal decking for bridges, airstrips and the like comprising: a plurality of interlocking angular units, each angular unit having a load bearing part and a truss part, each angular unit having at least one offset tongue portion on lengthwise side portions of the load bearing part and having at least one corresponding tongue opening in the truss part near the load bearing part aligned with a said tongue portion whereby each said tongue portion will fit into one of said tongue openings in a like shaped adjacent angular unit, each said tongue portion of the load bearing part of each said angular unit having substantial portions of its surface area in contact with a surface area of the load bearing part of said adjacent angular unit capable of withstanding a substantial portion of a torque producing load on the load bearing part of said angular unit and having end portions extending through and aligning with an opening in the load bearing part of an adjacent angular unit.

References Cited

UNITED STATES PATENTS

| | | | |
|---|---|---|---|
| 2,294,549 | 9/1942 | Greulich | 94—13 |
| 2,353,398 | 7/1944 | Greulich | 94—13 |
| 2,454,307 | 11/1948 | Cooley | 52—594 |
| 2,642,968 | 6/1953 | Roush et al. | 52—542 X |
| 2,689,366 | 9/1954 | Wichert | 52—180 X |
| 2,737,093 | 3/1956 | Greulich | 94—13 |
| 2,773,718 | 12/1956 | Bohlen | 52—579 X |

FOREIGN PATENTS

| | | |
|---|---|---|
| 834,438 | 5/1960 | Great Britain. |

FRANK L. ABBOTT, Primary Examiner

P. C. FAW, JR., Assistant Examiner

U.S. Cl. X.R.

14—73; 52—180, 581, 594

UNITED STATES PATENT OFFICE
CERTIFICATE OF CORRECTION

Patent No. 3,469,509 September 30, 1969

George Hutchinson

It is certified that error appears in the above identified patent and that said Letters Patent are hereby corrected as shown below:

Column 2, line 28, cancel "which is offset from the load bearing part". Column 6, line 56, cancel "a part".

Signed and sealed this 27th day of January 1970.

(SEAL)
Attest:

Edward M. Fletcher, Jr.
Attesting Officer

WILLIAM E. SCHUYLER, J
Commissioner of Patent